United States Patent
Nguyen et al.

(10) Patent No.: US 6,748,112 B1
(45) Date of Patent: Jun. 8, 2004

(54) METHOD AND APPARATUS FOR FINDING SHAPE DEFORMATIONS IN OBJECTS HAVING SMOOTH SURFACES

(75) Inventors: Van-Duc Nguyen, Albany, NY (US); Roderic Greene Collins, Troy, NY (US); Victor Nzomigni, Niskayuna, NY (US); Donald Wagner Hamilton, Jr., Burnt Hills, NY (US); Charles Vernon Stewart, Clifton Park, NY (US); Joseph Legrand Mundy, Schenectady, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 09/353,986

(22) Filed: Jul. 15, 1999

Related U.S. Application Data

(60) Provisional application No. 60/094,443, filed on Jul. 28, 1998.

(51) Int. Cl.$^7$ .............................. G06K 9/00; G06K 9/32; G06K 9/46; H04N 7/18; H04N 1/00
(52) U.S. Cl. ..................... 382/203; 382/151; 382/141; 382/173; 382/181; 382/199; 382/209; 382/218; 382/266; 382/276; 382/286; 382/294; 382/215; 348/92; 348/95; 358/406
(58) Field of Search ................. 382/103, 141, 382/145–147, 151, 154, 173, 181, 199, 203, 209, 218, 254, 266, 267, 276–277, 286–288, 289, 293–296, 298, 130, 215; 348/87, 92, 94–95; 358/406; 702/155, 167

(56) References Cited

U.S. PATENT DOCUMENTS

| | | | |
|---|---|---|---|
| 4,482,971 A | * 11/1984 | Blazek | 382/135 |
| 4,668,982 A | * 5/1987 | Tinnerino | 348/87 |
| 4,908,782 A | 3/1990 | Pekaret et al. | 702/167 |
| 5,047,966 A | 9/1991 | Crow et al. | 702/168 |
| 5,208,763 A | 5/1993 | Hong et al. | 702/95 |
| 5,521,847 A | 5/1996 | Ostrowski et al. | 702/152 |
| 5,627,771 A | 5/1997 | Makino | 702/155 |
| 5,715,166 A | 2/1998 | Besl et al. | 700/182 |
| 5,828,769 A | * 10/1998 | Burns | 382/118 |
| 5,917,940 A | * 6/1999 | Okajima et al. | 382/173 |
| 6,201,889 B1 | * 3/2001 | Vannah | 382/131 |
| 6,246,468 B1 | * 6/2001 | Dimsdale | 356/4.02 |

FOREIGN PATENT DOCUMENTS

EP  381 067  8/1990 ........... G06F/15/70

OTHER PUBLICATIONS

Ashbrook, et al "Constructing Models of Articulating Objects: Range Data Partitioning", IEEE, Mar. 1997, pp. 164–171.*

Lai, et al "Deformable Contours: Modeling and Extraction", IEEE, Nov. 1995, pp. 1084–1090.*

(List continued on next page.)

*Primary Examiner*—Leo Boudreau
*Assistant Examiner*—Daniel G. Mariam
(74) *Attorney, Agent, or Firm*—Jean K. Testa; Patrick K. Patnode

(57) ABSTRACT

The present invention is directed to an imaging apparatus for examining an object having smooth surfaces to determine shape deformations in the surface of object. The imaging apparatus includes an imaging device for obtaining a scanned image of the object to be examined. A reference image of the object is stored in a memory. An image register is coupled to the imaging device and to the memory containing the reference image of the object. The image register stores patch information corresponding to both the reference image and the scanned image. A transformation estimator is coupled to the image register, and provides a transform for registering the scanned image to the reference image. A deformation estimator is coupled to the transformation estimator and to the image register. The deformation estimator is configured to utilize the transform and the patch information to determine shape deformations of the object.

13 Claims, 4 Drawing Sheets

OTHER PUBLICATIONS

Mangin, et al "Nonsupervised 3D Registration of PET and MRI Data Using Chamfer Matching", IEEE, Feb. 1993, pp. 1262–1264.*

"Method and Apparatus for Calibrating a Non–Contact Range Sensor," Nguyen et al., Ser. No. 09/360,032, filed Aug. 23, 1999.

"Accurate Internal Camera Calibration Using Rotation, with Analysis of Sources of Error," GP Stein, Proceedings of the International Conference on Computer Vision, IEEE Comp. Soc. Press, vol. Conf. 5, Aug. 1995, pp. 230–236.

"CCD Camera Calibration and Noise Estimation," Proceedings of the Computer Society Conference on Computer Vision and Pattern Recognition, IEEE, vol. –, Mar. 1992, pp. 90–95.

"Fast and Robust Registration of 3D Surfaces Using Low Curvature Patches," V–D Nguyen; V. Nzomigni, CV Stewart, International Conference on 3D Imaging and Modeling, Ottawa, Oct. 1999, pp. 1–8.

* cited by examiner

METHOD AND APPARATUS FOR FINDING SHAPE DEFORMATIONS IN OBJECTS HAVING SMOOTH SURFACES

CROSS REFERENCE TO RELATED APPLICATIONS

This application claims priority to Provisional Application No. 60/094,443, entitled "Finding Shape Deformations in Airfoils or Generalized Cylinders," filed on Jul. 28,1998, which is incorporated herein by reference.

BACKGROUND OF THE INVENTION

The present invention relates generally to a method and apparatus for finding shape deformations in objects having smooth surfaces and in particular, to a method and apparatus for finding shape deformations in airfoils by registering surface points on an airfoil to a computer assisted drawing (CAD) model and analyzing and displaying principal modes of surface deformation to a user.

Currently, automated inspection is performed on manufactured parts such as airfoils (e.g. turbine blades) to detect deformities in the part. For purposes of this specification, deformities are defined to be deformations in the shape of an object as compared to its ideal shape. In other words, deformations are deviations in shape or form of an object from its manufacturing specifications. Shape deformation can occur in a variety of modes (referred to herein as deformation modes). Deformation modes include, but are not limited to, skew, twist, scaling and translation. Forged blades, such as those for aircraft engines, are currently inspected for platform orientation, contour cross-section, bow and twist along stacking axis, thickness and chord length at given cross-sections. One method of inspecting for shape deformations in these deformation modes is through the use of specialized hard gages built out from micrometers, calipers, and shims. The hard gages measure a plurality of defined contact points to characterize the blade that is used to detect defects. While the inspection of using the hard gages is fast, the hard gages provide only individual measurements at a few defined contact points.

In the alternative, blades can be fully scanned with coordinate measurement machines (commonly know as "CMMs") that translate and rotate a probe to sample points on the blade surface. CMMs provide dense measurements of the sample points, however the time to scan a blade is relatively slow. Once the dense surface points are collected, software processes these points into deviations to the CAD model and analyzes the deviations in terms of process-based shape deformations. Current processing software, however, is relatively slow.

Full-field non-contact range sensors can scan the external surfaces of the blade at 100× faster than CMMs. These non-contact range sensors, however, are 100× less accurate than the CMMs. Full-field non-contact range sensors are currently commercially available and include sensors based on laser line grating and stereo triangulation; single laser line scan plus rotating the part; and on phased-shift Moire and white light.

CAD/CAM software exists, such as ValiSys, a quality assurance software product available from Tecnomatix Technologies Inc., and UniGraphics Solutions™, which can register the surface points scanned by non-contact range sensors to a CAD model. The CAD/CAM software, however, has disadvantages in that it does not allow registration to special features characteristic of the shape of an airfoil, such as a 6-point nest. The points of a six point nest are: 4 points on the leading edge of the airfoil, 1 point near trailing edge and 1 point on the platform. The 6-point nest is common in airfoil analysis, design and manufacturing because it weights more accuracy on the leading edge, which is critical for the desired airflow.

BRIEF SUMMARY OF THE INVENTION

The present invention is directed to an imaging apparatus for examining objects having smooth surfaces for shape deformations. The imaging apparatus includes an imaging device for obtaining a scanned image of the object to be examined. A reference image of the object is stored in a memory. An image register is coupled to the imaging device and to the memory containing the reference image of the object. The image register stores patch information corresponding to both the reference image and the scanned image. A transformation estimator compares the scanned image to the reference image, and provides a transform which maps the scanned image to the reference image. A deformation estimator is coupled to the image register and to the transformation estimator. The deformation estimator decomposes the transformation parameters, based on patch information stored in the image register to determine shape deformations of the object.

BRIEF DESCRIPTION OF THE DRAWINGS

Referring now to the drawings wherein like elements are numbered alike in the several Figures.

DETAILED DESCRIPTION OF THE INVENTION

Figure 1:
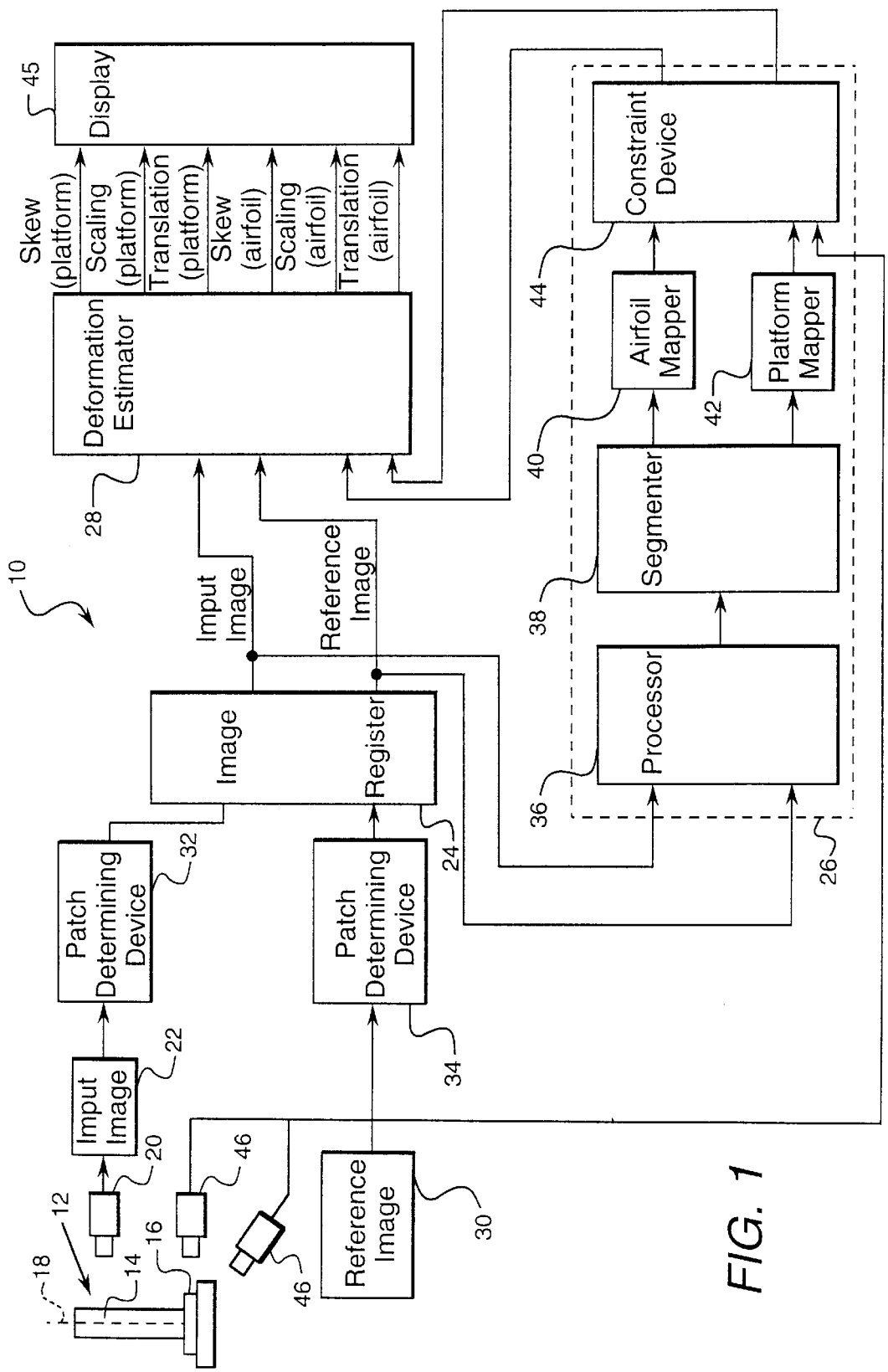
FIG. 1 is a block diagram of an apparatus for finding shape deformations according to one embodiment of the present invention.

For purposes of this specification, the following definitions of terms are provided. An image is defined herein to be a collection of data representing properties, design specifications, or attributes of an object. For example, a data collection which represents the 3 spatial dimensions (x,y,z) of an object is an image of the object. When such data are obtained by measuring the object and storing the measurements in memory, the stored measured data is referred to herein as scanned image 15. The data comprising a Computer Assisted Drawing (CAD), or other engineering specifications in digitized format, relating to the shape of an object, are referred to herein as images of the object. CAD data comprising specifications for an object to which the object will be compared for purposes of flaw detection is referred to herein as a reference image.

An arrangement of data representing an image is referred to herein as an array. Each element of an array is referred to herein as a pixel. A pixel represents a measurement or property at a given position on the surface of the object being measured. For example, a pixel can represent measurements of the distance of the object from the measuring device.

Mapping is the process of relating pixels in one image to pixels in another image. One method of mapping is accomplished by fitting a function to control point locations. Control points are features located in the scanned image whose location on the object and its images are known. Control points may be located both in the scanned image and in the reference image.

A typical mapping process employs models to simplify the process. A model is a function which maps points in one image to points on a second image. A typical mapping technique defines a grid on the second image and maps only the grid points to the model. All other points are found by interpolation within the grid.

For purposes of this specification, a patch is defined to be a grid on the reference image which grid encompasses at least a portion of the surface of the imaged object. The dimensions of the patch depend on the order of the deformation model.

Pose is defined to be the spatial orientation of an object with respect to a given viewpoint.

Alignment, or pose correction, is defined as orientation of a first object with respect to a second object so as to make at least one alignment parameter of the first object, such as planar position or angular orientation, substantially equal to the corresponding alignment parameter of the second object.

Registration is defined as the process of aligning a scanned image with a reference image. The registration process generally comprises two steps. The first step is to determine corresponding points, or features of the scanned image and the reference image. The second step is transforming the input and reference image to a common coordinate system. The transformation to a common coordinate system is typically a geometric transformation and includes translations, rotations, and scale changes. The transformation step positions the two images with respect to one another so that corresponding points in the images represent the same point on the object. In summary, registration involves orienting a first image with respect to a second image so as to make all alignment parameters of the first image the same as corresponding alignment parameters of the second image.

Alignment, or pose correction, is course, i.e., imprecise registration. For example, an alignment step for coarse relative positioning can be followed by a registration step to achieve fine or more precise relative positioning.

Pose error is defined to be the difference between the position of the object as represented in the scanned image of the object, and the position of the object as represented in the reference image of the object. In that sense, pose correction is repositioning the object such that the pose error is minimized.

Interpolation is defined to mean estimation of the values between two known values. The problem of accuracy is common to all transformations. On any grid, any geometric transformation results generally in points that do not any longer lie on the original grid. Therefore, suitable algorithms are required to interpolate the values at transformed points from the neighboring pixels. The high demands for position accuracy make image interpolation critical.

Matching is defined to mean post-registration comparison of a reference image with an scanned image, or vice versa, to determine differences which represent deviations of the scanned image from the reference image, or of the object's actual shape from it's ideal, or specified shape.

FIG. 1 is a block diagram of an apparatus 10 for finding shape deformations according to one embodiment of the present invention. Apparatus 10 is adapted to inspect and determine deformations of an object 12. Deformations may include tilt, bend, twist or warp in the surface shape of object 12 when compared to a CAD model or to other representations of the ideal configuration of object 12. In one embodiment of the invention, object 12 comprises a blade e.g., a turbine blade of an aircraft, having an airfoil 14 extending from a platform 16. While the following description is directed to inspecting airfoils such as aircraft engine blades, one skilled in the art will appreciate that the method may be used to find shape deformation in any object having smooth surfaces and a stacking axis generally similar to stacking axis 18.

The blade 12 to be inspected is positioned within the sensing range of an imaging device 20. In one embodiment of the invention, imaging device 20 obtains scanned image 22 and stores it in an image register 24 for further processing at a later time. In another embodiment the imaging device 20 operates in real time. In yet another embodiment of the invention, the imaging device 20 is a hard gauge comprising micrometers, calipers, and shims. The hard gage measures a plurality of defined contact points on the blade to characterize the blade.

In another embodiment of the invention, imaging device 20 is a coordinate measurement machine (CMM) which translates and rotates a probe around the blade 12 and records a plurality of contact points on the surface of blade. CMMs provide dense measurements of the contact points compared to hard gages. However, the length of time required to scan an object such as an aircraft engine blade is longer.

Yet another embodiment of the invention employs a full-field non-contact range sensor as an imaging device 20. The range sensor scans the external surfaces of the blade 12 about 100 times faster than a CMM. Range sensors, such as range cameras, take images similar to ordinary cameras except that, instead of measuring the visible light irradiated by an object, a range camera measures the distance from the camera to the surface of the object. Thus the image provided by a range camera is referred to as a range image. The embodiment illustrated in FIG. 1, imaging device 20 is a full field, non-contact, laser line grating range sensor mounted on a translation stage to acquire surface data.

Full field, non-contact range sensors suitable for use as imaging devices 46 are currently readily available from commercial sources. For example, Integrated Automation Systems' (IAS) model 4DI sensors are employed in one embodiment of the invention. These sensors are based on laser line grating and stereo triangulation. Another suitable range sensor is available from Cyber-Optics Co. These sensors are based on single laser line scan and rotation of the object. Other suitable range sensors are based on phased-shift Moire' and white light. One embodiment of the invention employs a plurality of range sensors mounted on translation stages to acquire dense surface data, and further includes a rotation stage to rotate the blade 12.

Those of ordinary skill in the art will recognize other imaging devices such as x-ray and Magnetic Resonance Imaging (MRI) devices can provide an scanned image 15 for use in accordance with the present invention. Accordingly, the invention is not intended to be limited to imaging devices which provide range images.

Three dimensional data are obtained from the blade 12 by scanning the blade 12 with imaging device 20. In one embodiment of the invention the data are stored in memory 22, and provided from memory 22 to a patch determining device 32.

A reference image is stored in a reference image memory 30. A reference image comprises digital data to which the scanned image 22 of blade 12 will be compared in order to detect deformations in blade. A reference image comprises ideal characteristics of blade 12 including ideal shape data. There exist several types of reference images suitable for use in the present invention. Among them are reference images created prior to scanning the object to be inspected, reference images derived from other products shaped similarly to the object to be inspected, reference images derived from known defect-free products, and reference images generated from design data, such as CAD models.

According to one embodiment of the present invention, patch determining devices 32 and 34 comprise processors programmed to portion the scanned image 22 and the reference image 30 into a plurality of surface areas, referred to herein as patches. A patch can include one or more sections of a grid of a CAD image, and portions thereof. In one embodiment of the invention, the number of patches into which the reference image 30 is portioned is manually selected by an operator. The more patches selected the smaller will be the area of each patch, and conversely, the fewer patches selected the larger will be the area of each patch. Larger patches provide coarse registration of blade 12 to the reference image 30 and smaller patches allow for finer the registration of blade 12 to reference image 30.

In one embodiment of the invention, patch determining devices 32, 34 operate independently of the other elements of system 10. In other words, patch determining devices 32, 34 compute low curvature patches off-line and store the low curvature patches in the image register 24 for registration with object 12 at a later time. Based on the patch scale selected by the operator, the reference image 30 is digitized at regular grid points on the CAD image grid which fall within each patch. In one embodiment of the invention, the local curvature of grid points within each patch is checked, and those patches containing grid points having curvature minima are retained. In one embodiment of the invention, a least square error technique is utilized to check local curvature. Thus a set of low curvature patches is obtained for the selected scale. Each selected low curvature patch represents a low curvature surface portion of reference image 30. The scale may be varied by the operator such that a plurality of patch sets, each set corresponding to a different patch size, or scale, is obtained and stored. In this manner, coarse to fine registration of scanned image of blade 12 to reference image 30 may be achieved quickly.

Data representing the patches are then stored in the image register 24. In one embodiment of the invention, each patch Pi is represented in the image register 24 by its center position pi and its normal ni. The patch determining devices 32, 34 calculate a center point $p_i$ for each low curvature surface patches $P_i$. In one embodiment of the invention, the center point p of a patch is defined to be the patch's center of mass. As those of ordinary skill in the art will recognize, other schemes for representing patches may be devised, including schemes which define center point differently, which remain within the scope of the present invention. The patch determining devices 32, 34 are programmed to determine a vector $n_i$ normal to each patch $P_i$ at its center point $p_i$. Point pairs $p_i, n_i$ are then stored in the image register 24.

Point pairs $p_i, n_i$ are provided to the transformer estimator 26. Transformation estimator 26 analyzes a plurality of point pairs $p_i, n_i$. For each patch center point p, transformation estimator 18 determines a corresponding point q on a corresponding patch P' of scanned image 22. As previously stated, scanned image 22 comprises data representing measurements taken of the surface of blade 12.

The transformation estimator 26 includes a processor 36 that receives center location $p_i$ and normal $n_i$ for each of the patches $P_i$ and determines where a geometric extension of the normal vector from point $p_i$ from the reference will intercept the scanned image data. This location is termed $q_i$ and defined to be the intersection point on the scanned image data from an extension of the normal of the ith patch of the reference image data. The processor 36 further minimizes each of the distances d(P, P') from the reference image patches to the scanned image patches. To determine the distance minimization, the transformation estimator 26 receives pi, qi and ni for each patch Pi and determines the pose error between the reference image 30 and the scanned image 22. In one embodiment of the invention, the scanned image data are weighted according to pose error to compensate and minimize the pose error. The foregoing results in the registration of the reference image to the scanned image.

The transformer estimator 26 further includes a segmenter 38, an airfoil mapper 40, a platform mapper 42 and a constraint device 44. The processor 36 aligns and registers the scanned data points of the scanned image 22 with the CAD model. The segmenter 38 then separates the registered scanned data of the blade 12 into airfoil data and platform data. Each segment of data is provided to the respective airfoil mapper 40 and platform mapper 42 which map the respective data points to the CAD model. The constraint device 44 adds leading edge constraints and platform constraints to the registration.

The output of the transformation estimator 26 is a transform (T) which maps registered scanned image 22 and registered reference image 30 to each other. The transform is provided to deformation estimator 28, which decomposes the transformation parameters into principal deformation modes of skew, scaling and translation for both the airfoil and its platform. The decomposed parameters are then provided to a display 45, which presents shape deformations to an operator in each deformation mode. This display allows the operator to correct the deformations of the object.

Figure 2:
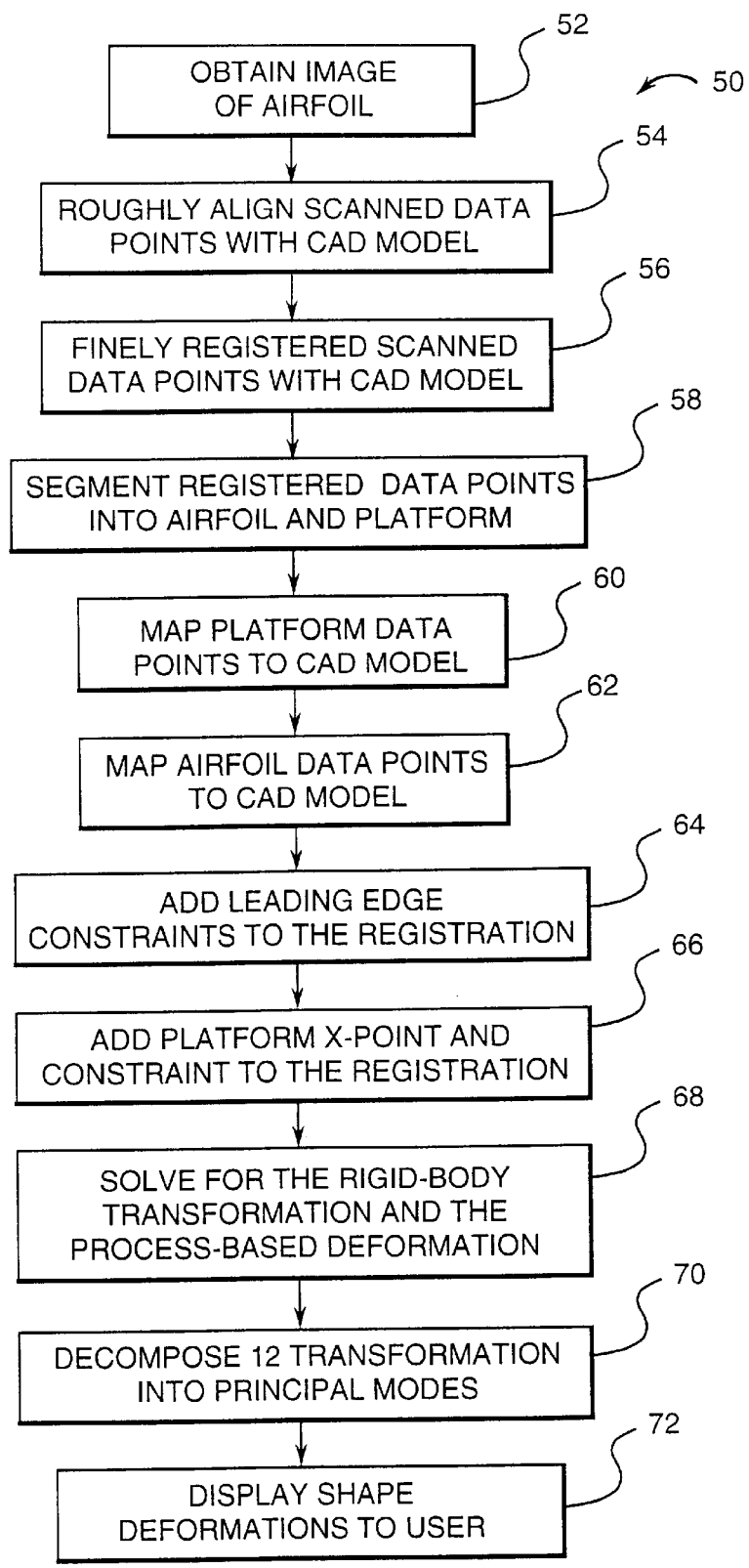
FIG. 2 is a flowchart of the method, embodying the present invention, of finding and displaying the deformation of an airfoil.

Referring now to FIG. 2, the method of inspecting and determining shape deformations of an object 50, such as a turbine blade, in an exemplary embodiment of the invention is illustrated.

At step 52, the blade 12 is scanned by the imaging device 20 to obtain data points comprising scanned image 22 of the blade. In step 54, the processor 36 of the transformation estimator 26 aligns the centers of gravity and the moments of inertia of the surface data points of the blade 12 and a corresponding CAD model 30 of the blade. As a result of this alignment, the scanned data of the blade 12 is aligned with the CAD model 30 to give a large domain of convergence. Large is defined to be translation up to about +/−half the size of object 50, and rotation is up to about +/−45 degrees.

In step 56, the scanned data points representing the blade 12 are registered to the CAD model 30 using robust least-square and low curvature patches. In one embodiment of the invention, robust registration of the data points using low curvature patches is performed by a Robust-Closest Patch algorithm (RCP) that accurately registers the data points to the CAD model, using all points on all visible and stable surfaces of the part. The RCP algorithm iteratively matches model patches to data surfaces based on the current pose and then re-estimates pose based on these matches. In one embodiment of the invention, registration using RCP is driven by low curvature patches computed from the model off-line. The RCP algorithm uses an approximate normal distance between a patch and a surface to avoid the need to estimate local surface normal and curvature from noisy data. Pose is solved by a linear system in six parameters, using a symmetric formulation of the rotation constraint. The transformation estimator 26 estimates both the rigid pose parameters and the error standard deviation to provide robustness. The RCP algorithm will be described in greater detail hereinafter.

In step 58, the segmenter 38 segments the registered data points into the data points representative of the both the airfoil 14 and the platform 16, based on the proximity of the scanned data points to the CAD airfoil or platform. The platform 16 provides a reference for mapping the data points to the CAD model 30. In step 60, the platform mapper 42 maps the platform data points to the CAD model through a rigid-body transformation comprising three (3) translations and three (3) rotations. In step 62, the airfoil mapper 40 maps registered data points on the airfoil 14 to the CAD model 30 through a rigid-body transformation plus a simple deformation. The mapping is performed by linearly transforming the cross-section along the stacking axis 18 of the blade 12. This shape deformation includes six (6) more parameters that include two (2) bend or translation of the cross-section, two (2) for twist, opening/closing of the cross-section, and two (2) for bulge, scaling of the cross-section.

In step 64, the constraint device 44 adds leading edge constraints to the steps of registering the airfoil 14 to the CAD model 30. The leading edge constraints are derived from at least one, but preferably two, images received by a pair of cameras 46. In one embodiment of the invention, the airfoil 14 is back-lit to project a profile of the airfoil to the cameras 46.

The leading edge constraints approximate a six point nest of contacts. In other words, the added constraints fixture the leading edge with 4 point contacts, which constrain 2 orientations and 2 locations. In step 66, platform x-point constraint is added to the registration, which is equivalent to 1 point contact on the platform 16, to zero-out the translation along the stacking axis 18. Low curvature patches on the airfoil 14 provide a point contact near the trailing edge of the airfoil.

Increasing the weights to these additional constraints converge to 6-point nest registration. This over-constrained system gives improved precision and accuracy than the 6-point contact provided in hard gages or CMMs.

In step 68, the rigid-body transformation and the process-based deformation is solved from the low-curvature patches and the additional constraints on the leading edge and platform. The data points of the rigid-body transformation and deformation are segmented, with data points segmented into the airfoil 14 and platform 16, so different constraints and transforms can be applied thereto. In one embodiment of the invention, a total of 12 transformation parameters comprising three (3) translations, three (3) rotations, and six (6) deformation parameters are found. Transformations are 4×3 matrices, with the last row being the translation.

In step 70, the twelve (12) transformation parameters are decomposed into a number of principal modes, such as translation, orientation, bend, twist, bulge, etc., wherein the most significant transformation parameter is decomposed first. To ensure the decomposition is unique and accurate, the effects of the principal modes are decomposed. In step 72, the effects of the principal modes are then displayed as gage measurements representative of the translation and orientation for platform gage, the bend for bow gage, twist for twist/warp gage, opening/closing for contour gage, and bulge for thickness gage.

Figure 3:
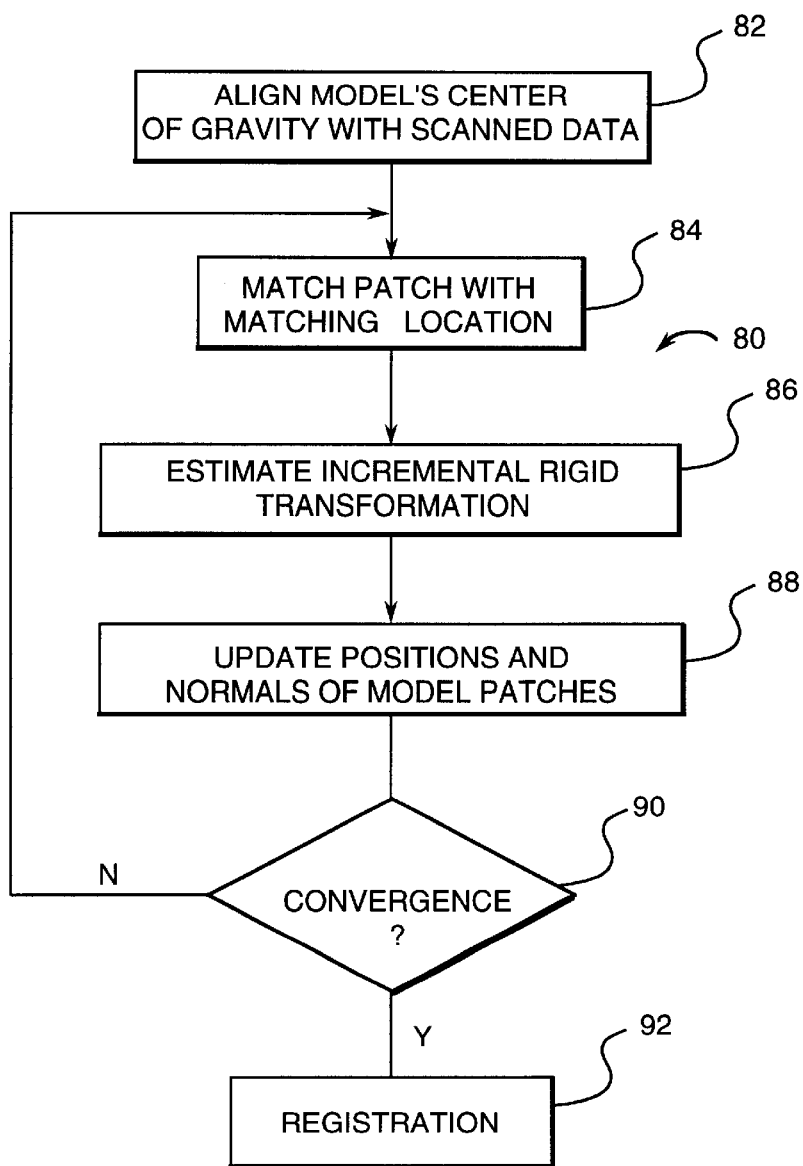
FIG. 3 is a flowchart of the method of registering scanned data points of the object and the CAD model.

As shown in FIG. 3 the scanned data points of the airfoil are finely registered to the CAD model. In one embodiment of the invention fine registration is accomplished using an RCP algorithm. Generally ,given an initial rigid pose, the RCP algorithm matches each scanned data point to its nearest point on the model surface, computes the 3D rigid transformation that best aligns these matches, and repeats these two steps using the most recently estimated pose until convergence.

In one embodiment of the invention, pose is solved by singular value decomposition of a linear system in six parameters. Another embodiment of the invention is constructed from a linear and symmetric formulation of the rotation constraint using Rodrigues' formula rather than quatemions or orthonormal matrices. An M-estimator estimates both the rigid pose parameters and the error standard deviation to ensure robustness to gross errors in the data. The RCP algorithm iterates two steps until convergence. First, the RCP algorithm matches model and data points based on the current pose estimate. Next, the RCP algorithm refines the pose estimate based on these matches.

Much of the computation is done off-line by pre-computing low curvature patches. Given the approximate viewpoint, the model surface can be digitized at regular grid points on an image plane, local curvature patches retained, giving a set of regularly spaced patches. Each patch $P_i$ is represented by its center position $p_i$ and its outward normal $n_i$, as shown in FIG. 4.

To compute on-line a given range data set, the RCP algorithm 80 (shown in FIG. 3) translates the model patches to align the model's center of mass with that of the data in step 82. Initial rotation is given by the assumed view point.

Figure 4:
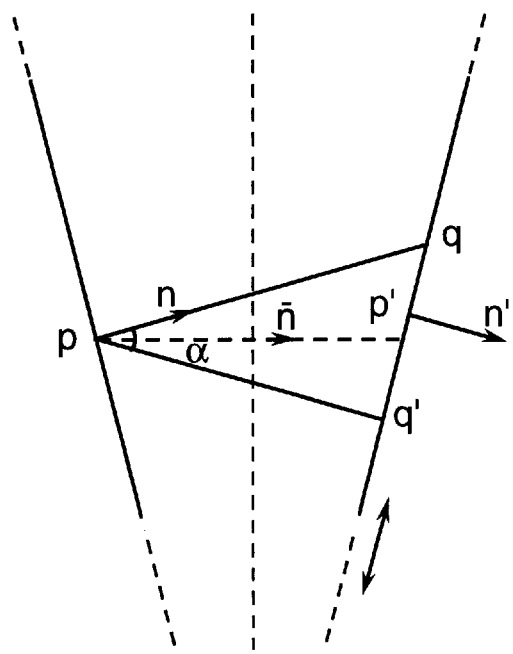
FIG. 4 is a diagrammatic view representative of the deviation between a planar patch of the CAD model and a planar surface of the object.

In step 84, RCP algorithm 80 finds for each patch Pi the matching location $q_i$ by moving a matched filter, sized to $P_i$, along the line $l_i$, through $p_i$ and parallel to $n_i$, searching for the nearest significant response from current location $p_i$, as shown in FIG. 4. This estimates the piercing point of $l_i$ with the implicit surface from which the data are measured without the expensive and noise sensitive process of estimating surface parameters from the data. Match point $q_i$ is a good approximation of the ideal match for $p_i$ if the patch $P_i$ has low curvature, as will be described in greater detail hereinafter.

In step 86, RCP algorithm 80 then estimates the incremental rigid transformation, $\Delta T=(R, t)$, by minimizing the sum of the squared, approximate normal distances (8) between model patches and data surfaces:

$$\min_{\omega, t''} \sum_i [((I - W/2)q_i - (I + W/2)p_i - t'')^{Tn_i}]^2. \quad (1)$$

In this norm, error is calculated by rotating the data and model locations, $q_i$ and $p_i$, each halfway toward the other, then taking the dot product of their difference along the model normal $n_i$. The least-squares pose minimization and its robust version will be discussed in greater detail hereinafter.

In one embodiment of the invention, instead of using a quaternion or a small angle approximation, rotation R is represented by the skew symmetric matrix W, which describes the cross-product between a 3-element rotation vector $$\omega = 2\tan\frac{\theta}{2}u$$

and either $p_i$ or $q_i$. $\theta$ is the angle and u is the unit vector of the axis of rotation. The rotation vector ω and translation t'' are solved directly from Equation (1) with singular value decomposition, and then ΔT is $$R=(I\ W/2)-1(I+W/2) \qquad (2)$$

$$t=(I+W/2)t''$$

In step 88, RCP algorithm 80 updates the positions and normals of the model patches and accumulates the incremental transformation in to the current pose:

$$p_i = Rp_i + t$$

$$n_i = Rn_i \qquad (3)$$

$$T = \Delta T \times T$$

This entire registration process is embedded in a multi-resolution framework, using a few large patches at the coarsest resolution to eliminate the largest registration errors, and many small patches at the finest resolution for precise registration.

Steps 84, 86, and 88 are repeated until convergence and the data points are registered to the CAD model, as best shown in steps 90 and 92.

FIG. 4 depicts flat patches P and P' to be registered. Patch P is disposed on the model surface, with mid point p and normal n defined a priori (CAD model). Patch P' is inferred from the range data as part of a larger planar surface with normal n'. Since the local patch P' has no detectable boundaries or landmarks, its midpoint p' can not be found by local features detection and matching. Instead, the location p' corresponding to point p is constructed to be the projection of p onto the infinite plane supporting patch P', along the average normal n:

$$\bar{n} = \frac{n+n'}{\|n+n'\|} = \frac{n+n'}{2\cos(\alpha/2)} \qquad (4)$$

$$\alpha = \arcsin(\|n \wedge n'\|)$$

The average of the two normals is meaningful if $n^T n' > 0$, which formalizes our assumption of rough alignment. Instead of constructing p' based on the average normal n, intersection points q and q' can be constructed by projecting p along the normal n and n' respectively. Al three are related, and so the distance measure between a model patch P and a data surface containing patch P' can be constructed as:

$$d(P, P') = (p'-p)^T \bar{n} \qquad (5)$$

$$= ((q-p)^T n)(\cos \alpha / \cos(\alpha/2))$$

$$= ((q'-p)^T n')/\cos(\alpha/2)$$

Note that the patch P' is free to rotate and translate tangentially along its surface. The normal distance between point and surface is minimized, leading to faster convergence to the final pose than minimizing the Euclidean distance between model and matched points.

Figure 5:
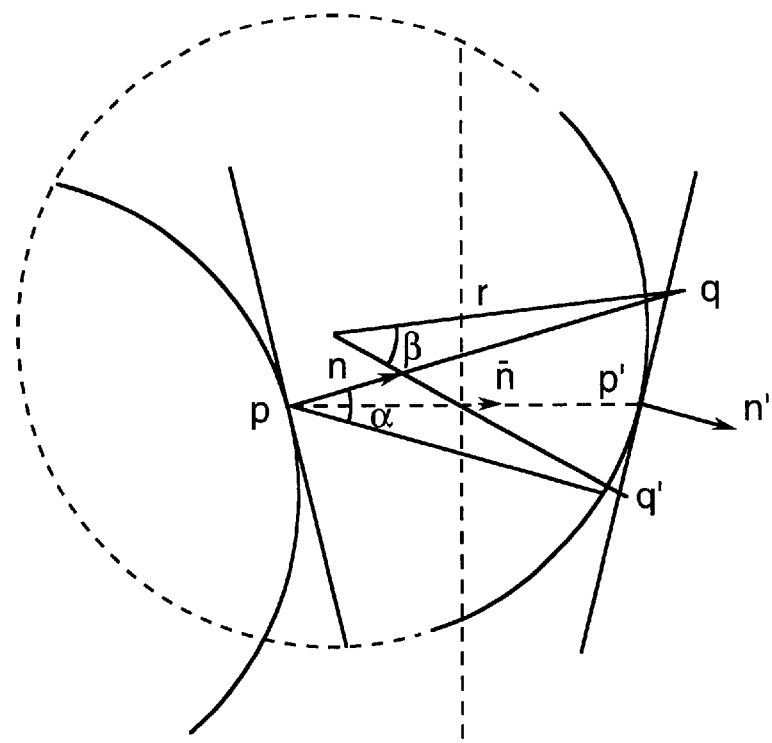
FIG. 5 is a diagrammatic view representative of the deviation between a curved patch of the CAD model and a curved surface of the object.

FIG. 5 depicts curved patches P and P' to be registered. The local radius of curvature at the patches P and P' is represented by r. The q and q' are now on the curved patch P', and are found from the mid point p of patch P, along the normals n and n' respectively. The distance measure between a curved patch and a curved surface, is defined as:

$$d(P, P') = (p'-p)^T \bar{n} \qquad (6)$$

$$\approx ((q-p)^T n + r\beta^2/8)(\cos \alpha / \cos(\alpha/2))$$

$$\approx ((q'-p)^T n' + r\beta^2/8)\cos(\alpha/2)$$

$$\beta \approx \alpha\ d(P, P')/r$$

Low curvature is defined herein to be a local radius of curvature r greater than the absolute normal distance |d(P, P')|. In particular, the curved arc between points q and q' makes an angle at the mid point p, and angle β at the center of curvature of the patch P'. Using Taylor expansions and eliminating β, local curvature is shown to only add second order terms in α:

$$d(P, P') \approx (q-p)^T n(1+(d(P, P')/r-3)\alpha^2/8) \qquad (7)$$

$$\approx (q'-p)^T n'(1+(d(P, P')/r+1)\alpha^2/8)$$

The following approximate normal distance between low curvature patches and surfaces is used to avoid stimulating local surface normal and curvature from ranged data:

$$d(P,P') \sim (q-p)^T n \qquad (8)$$

This approximation is valid when α=0 and r>|d(P, P')|.

Figure 6:
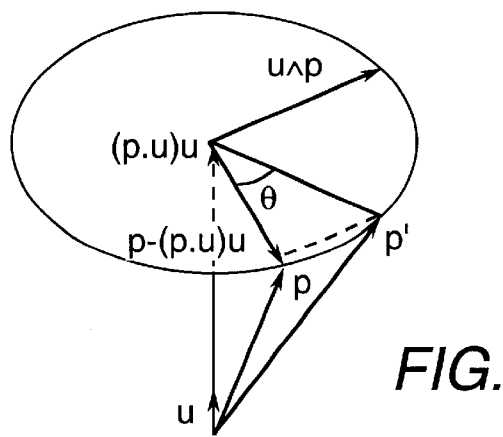
FIG. 6 is a diagrammatic view illustrative of the Rodrigues' formula.

FIG. 6 illustrates the following formula of Rodriques for determining the linear solution of pose:

$$p' = (p^T u)u + (p^T u)u)\cos\theta + (u \wedge p)\sin\theta \qquad (9)$$

Pure rotation by an angle θ around an axis is described by the unit vector u, p'=Rp. Rotating p' back to p requires reversing the sign of θ. Using this to form an equation similar to Equation (12), subtracting the two equations, then using the fact that p'−p is normal to u and rearranging slightly yields the direct solution of rotation:

$$(p'-p) = \omega \wedge (p+p')/2 \qquad (10)$$

$$\omega = 2\tan\frac{\theta}{2}u$$

The axis of rotation u and the angle of rotation θ are all described in the 3-component vector ω with no additional constraints on it. The rotation vector ω has singularity at θ=π, but no singularity at θ=0, unlike a quaternion. The singularity at θ=π is unavoidable since all rotations can not be represented using just three parameters.

When rotation and translation are both involved, p'=Rp+t. Substituting p'−t in place of p' in Equation (13) yields the direct solution of the full pose:

$$(p'-p) = \omega \wedge (p+p')/2 + t'' \qquad (11)$$

$$t'' = t - \frac{1}{2}\omega \wedge t$$

$$\sigma = 1.483\ \text{median}\ \{|ri(\omega, t'')|\}, \qquad (12)$$

The present invention is embodied in the form of computer-implemented processes and apparatuses for practicing those processes. Another embodiment of the invention is computer program code containing instructions embodied in tangible media, such as floppy diskettes, compact disks such as CD-ROMs, hard drives, or any other computer-readable storage medium, wherein, when the computer program code is loaded into and executed by a computer, the computer becomes an apparatus for practicing the invention. One embodiment of the present invention is in the form of computer program code whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

As described, the present invention is useful to compare old airfoils to new ones, or to their CAD models, for improved diagnosis, repair, or rebuild of turbines. The applications would extend to all generally curved shapes including generalized cylinders. For generalized cylinders the intent is to find shape deformations along the axis of the generalized cylinder. Specialized tubings and pipes in engines are further examples of applications for the present invention. This invention allows the replacement of expensive hard gages, customized to each blade model, by a Light Gage system that is programmable for all models.

The invention can also be used to register and find deformations in bones, blood vessels, or the spinal cord, to fuse MR, CT, ultrasound data, or to correspond patient data to an atlas. This will allow better visualization and accurate localization of tumors in image-guided surgery.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A method of finding shape deformations in an object, the method comprising the steps of:
   obtaining a digitized scanned image of said object;
   providing a digitized reference image of said object;
   registering said scanned image with said reference image by comparing a plurality of respective surface areas of selectable size and number from each of the scanned image and the reference image;
   obtaining rigid body transformation parameters of said registered images, said transformation parameters comprising two translations of a cross-section, a translation for opening/closing a cross section, and two translations for scaling of a cross-section; and,
   decomposing said transformation parameters to determine shape deformations of said object.

2. The method of claim 1 wherein said reference image is a Computer Assisted Drawing (CAD) model of said object.

3. The method of claim 1 wherein the step of registering comprises aligning data points from said scanned image with said reference image.

4. The method of claim 1 wherein the step of registering comprises registering said scanned image with said reference image.

5. The method of claim 4 wherein the step of fine registration uses robust least-square and low curvature patches.

6. The method of claim 4 wherein the step of fine registration uses points on all visible surfaces of said object.

7. The method of claim 4 wherein the step of fine registration comprises iteratively matching model patches to data points of said scanned image.

8. The method of claim 1 wherein said object is an airfoil.

9. The method of claim 1 wherein the said rigid-body transformation parameters include three translations and three rotations.

10. The method of claim 1 wherein said transformation parameters are decomposed into a plurality of deformation modes.

11. The method of claim 10 wherein said deformation modes include translation, orientation, bend, twist and bulge.

12. The method of claim 10 further comprising the step of displaying shape deformation information relating to said deformation modes as gage measurements.

13. A storage medium encoded with machine-readable computer program code for modeling an object an object comprising instructions for causing a computer to implement a method comprising the steps of:
    obtaining a digitized scanned image of said object;
    providing a digitized reference image of said object;
    registering said scanned image with said reference image by comparing a plurality of respective surface areas of selectable size and number from each of the scanned image and the reference image;
    obtaining rigid body transformation parameters of said registered images, said transformation parameters comprising two translations of a cross-section, a translation for opening/closing a cross section, and two translations for scaling of a cross-section; and
    decomposing said transformation parameters to determine shape deformations of said object.

* * * * *